No. 792,613. PATENTED JUNE 20, 1905.
H. C. PORTER.
BATTERY GRID.
APPLICATION FILED AUG. 19, 1904.
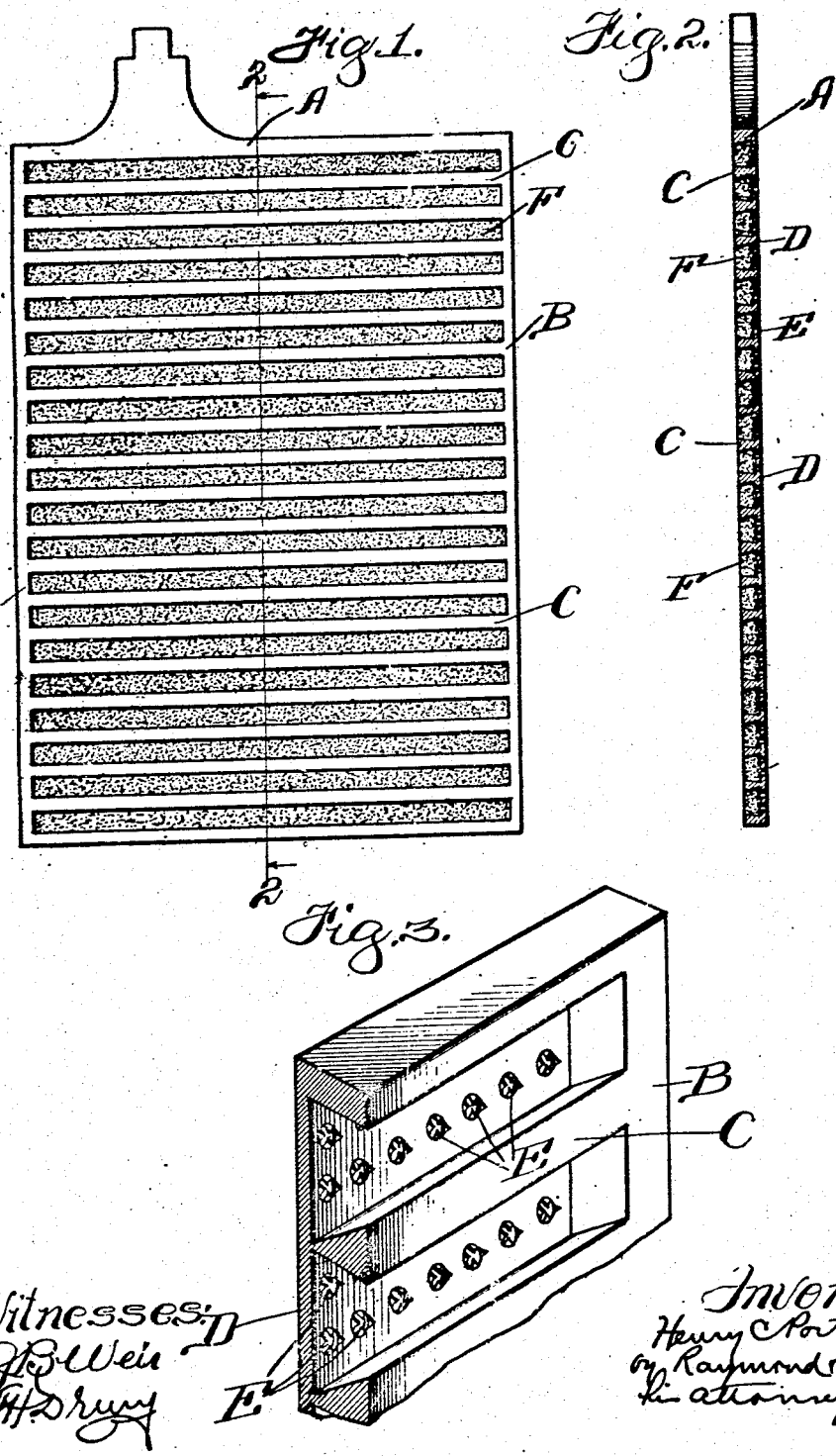

No. 792,613.

Patented June 20, 1905.

UNITED STATES PATENT OFFICE.

HENRY C. PORTER, OF WAUKEGAN, ILLINOIS, ASSIGNOR TO EVANSVILLE BATTERY & ELECTRIC COMPANY, OF EVANSVILLE, INDIANA, A CORPORATION OF INDIANA.

BATTERY-GRID.

SPECIFICATION forming part of Letters Patent No. 792,613, dated June 20, 1905.

Application filed August 19, 1904. Serial No. 221,369.

*To all whom it may concern:*

Be it known that I, HENRY C. PORTER, a citizen of the United States, residing at Waukegan, in the county of Lake and State of Illinois, have invented certain new and useful Improvements in Battery-Grids, of which the following is a specification.

My invention relates to that particular type of electrical secondary or storage battery plates, which are designated as "Faure" or "pasted-plate" type, in which a lead oxid or some other similar medium is employed as an active material in connection with the grid. In this type of storage batteries to which my invention relates a grid of metallic lead is employed to which the lead oxid or other material designed to be used as the active material is applied. In storage batteries of this type much difficulty is encountered in providing means for holding the active material in proper position and in intimate contact with the grid. When the electrode with this applied material is subjected to the influence of the electric current, the metallic grid or support is subjected to a strain which frequently causes warping or buckling. The action of the electrolytic fluid on the active material tends to disintegrate it, and unless the grid is constructed so as to securely retain it in place some of the active material will separate from the main body and accumulate at the bottom of the cell. This will tend to cause short-circuiting and will also serve to still further warp the grid. This warping of the grid will also cause the dislocation of more active material, the accumulation of which at the bottom of the cell will increase the danger from short-circuiting and greatly shorten the life of the grid, besides destroying the efficiency of the electrode.

In order to obtain the most desirable results and attain the greatest efficiency for the battery, it is essential that while the active material or material to become active must be securely retained on the grid free and open places must be provided through which the electrolytic fluid may find free circulation to attack and act upon the active material.

My invention has for one object the provision of means whereby the active material or material to become active shall be firmly secured and held against dislodgment in the electrode under the influence of the charge and discharge of the electromotive force.

A further object of my invention is to provide means for the free circulation and penetration of the electrolyte in and around the outer and subjacent exposed surfaces of the material.

A further object of invention is the prevention of the buckling of the plate, with a consequent loss of electromotive force.

These and such other objects as may hereinafter appear are attained by the devices shown in the accompanying drawings, in which—

Figure 1 is an elevation of a grid of my improved type. Fig. 2 is a vertical section of Fig. 1 on the line 2 2 looking in the direction indicated by the arrows. Fig. 3 is a view of one corner of the plate.

Referring by letter to the accompanying drawings, A represents the body of the grid which constitutes the support for the active material. This grid, which is shown as constructed with solid edges B, is made up of a series of interior longitudinal bars C, which, while they may be of any desired shape without departing from the spirit of my invention, are here shown as triangular. These bars are integrally attached to a back plate D, in which are provided a plurality of openings E. These openings may be formed when the plate is cast; but I prefer to have the plate perforated after casting in such a way that tangs F are formed on the inner side of the back plate. By this method of construction I provide a grid with a solid back plate which will so stiffen the grid as to reduce the danger of warping to a minimum. The peculiar construction of the bars in connection with the inwardly-projecting tangs allows a large amount of active material or material to become active to be securely retained in place and at the same time provides the necessarily free access of the electrolytic fluid.

While I have illustrated one form of my invention, it is evident that other constructions are possible without departing from the spirit of my invention.

I claim—

1. A metallic battery-plate comprising a back plate provided on one face thereof with integral metallic bars arranged to form pockets for the retention of active material, said back plate being perforated at the back of said pockets.

2. A metallic battery-plate comprising end bars, a series of longitudinal bars of triangular cross-section and a perforated back plate.

3. A metallic battery plate or grid comprising a back plate provided on one face with integral end bars and with integral longitudinal bars of triangular cross-section arranged with the narrow edge adjacent to the back plate, to form pockets for active material, said back plate being perforated between said bars.

4. A battery-plate comprising end bars, a series of longitudinal bars, a perforated back plate, and inwardly-projecting tangs.

5. A battery-plate comprising end bars, a series of longitudinal bars integral therewith, a perforated back plate integral thereto, and inwardly-projecting tangs.

6. A battery-plate comprising end bars, a series of triangular longitudinal bars integral therewith, and a perforated back plate provided with inwardly-projecting tangs, said bars being so arranged that one face thereof shall be parallel to said back plate

HENRY C. PORTER.

Witnesses:
F. H. DRURY,
O. R. BARNETT.